United States Patent
Yoshikawa

(10) Patent No.: US 11,412,522 B2
(45) Date of Patent: Aug. 9, 2022

(54) COMMUNICATION APPARATUS, CONTROL METHOD, AND STORAGE MEDIUM

(71) Applicant: CANON KABUSHIKI KAISHA, Tokyo (JP)

(72) Inventor: Yuki Yoshikawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/541,359

(22) Filed: Aug. 15, 2019

(65) Prior Publication Data
US 2020/0068585 A1 Feb. 27, 2020

(30) Foreign Application Priority Data
Aug. 27, 2018 (JP) .............................. JP2018-158572

(51) Int. Cl.
| H04W 72/10 | (2009.01) |
| H04W 28/02 | (2009.01) |
| H04W 24/10 | (2009.01) |
| H04B 17/318 | (2015.01) |
| H04W 8/24 | (2009.01) |
| H04L 5/00 | (2006.01) |

(52) U.S. Cl.
CPC .......... *H04W 72/10* (2013.01); *H04B 17/318* (2015.01); *H04W 8/24* (2013.01); *H04W 24/10* (2013.01); *H04W 28/0278* (2013.01); *H04L 5/0007* (2013.01)

(58) Field of Classification Search
CPC .................................................... H04W 72/10
See application file for complete search history.

(56) References Cited

U.S. PATENT DOCUMENTS

| 9,900,871 B1 | 2/2018 | Ryu et al. |
| 9,906,983 B2 | 2/2018 | Sirotkin |

(Continued)

FOREIGN PATENT DOCUMENTS

| EP | 2963981 A1 | 1/2016 |
| RU | 2663810 C1 | 8/2018 |

OTHER PUBLICATIONS

Extended European Search Report issued in European Application No. 19189985.5 dated Jan. 14, 2020.

(Continued)

*Primary Examiner* — Edan Orgad
*Assistant Examiner* — Won Tae C Kim
(74) *Attorney, Agent, or Firm* — Rossi, Kimms & McDowell LLP

(57) ABSTRACT

A communication apparatus obtains information regarding an access category of transmission data in each of a plurality of other communication apparatuses including a first communication apparatus and a second communication apparatus, allocates wireless resources of OFDMA such that a transmission opportunity of the first communication apparatus does not precede a transmission opportunity of the second communication apparatus that has transmission data of a higher-priority access category than an access category of transmission data in the first communication apparatus, and receives a signal that has been transmitted using OFDMA in accordance with allocation of wireless resources and that conforms to an IEEE802.11 series standard.

15 Claims, 13 Drawing Sheets

(56) References Cited

U.S. PATENT DOCUMENTS

2017/0105143 A1    4/2017  Seok
2017/0265191 A1*  9/2017  Ahmed ............. H04W 72/0453
2017/0311318 A1*  10/2017  Li ........................... H04L 47/14
2017/0332385 A1    11/2017  Shirali
2019/0090259 A1*  3/2019  Oteri ................. H04W 28/0242

OTHER PUBLICATIONS

Office Action issued in Russian Appln. No. 2019126484 dated Jun. 18, 2020. English translation provided.

* cited by examiner

FIG. 13

| Category | Tone Size | Access Category |
|---|---|---|
| 1 | 242 | AC_VO |
| 2 | 106 | AC_VI |
| 3 | 52 | AC_BE |
| 4 | 26 | AC_BK |

COMMUNICATION APPARATUS, CONTROL METHOD, AND STORAGE MEDIUM

BACKGROUND OF THE INVENTION

Field of the Invention

The present invention relates to a technique for allocating wireless resources of wireless communication.

Description of the Related Art

In wireless communication, various techniques including multiplexing in various dimensions such as time, frequency, power, code, and space are used in order to efficiently use a limited frequency band. In a wireless LAN, attempts have been made to expand the communication capacity by introducing a multivalued modulation system, channel bonding, MIMO (multiple-input and multiple-output), and the like.

IEEE (The Institute of Electrical and Electronics Engineers) is in action for standardization of the IEEE802.11ax standard as an efficient next-generation wireless LAN standard. According to the IEEE802.11ax standard, a frequency band can be allocated in a size smaller than a conventional size of 20 MHz, and thereby a large number of terminals can use wireless resources at the same time. Such allocation of wireless resources is performed using OFDMA (Orthogonal Frequency Division Multiple Access). According to the IEEE802.11ax standard, for example, a 20 MHz bandwidth is divided into nine blocks each having 26 subcarriers (tones) that do not overlap each other on the frequency axis, and wireless resources are allocated to terminals in units of blocks. Such a block that is a unit for allocation is referred as "resource unit (RU)", and the size of an RU can be determined in accordance with the number of terminals to which a frequency bandwidth and wireless resources are allocated. Note that the size of an RU is expressed in numbers of tones, and, for example, it is possible to use 26, 52, 106, 242, 484, 996, and 2×996 tones, but a value of 242 or smaller from among them can be used for a 20 MHz bandwidth. When allocating the entirety of a 20 MHz bandwidth to one terminal, 242 tones can be allocated at a maximum. On the other hand, for example, when nine terminals use a 20 MHz bandwidth at the same time, 26 tones are allocated to each of those terminals. In this manner, by dividing the frequency band into 26 tones, which is a minimum unit for allocation, the nine terminals can perform communication at the same time using the 20 MHz bandwidth. Similarly, when frequency bandwidths of 40 MHz, 80 MHz, and 160 MHz are used, 18, 37, and 74 terminals at a maximum can perform communication at the same time, respectively.

U.S. Pat. No. 9,900,871 specification describes that, according to the IEEE802.11ax standard, an AP transmits a frame called "trigger frame (TF)", and each terminal transmits an uplink (UL) frame in response to it. In addition, in U.S. Pat. No. 9,900,871 specification, an access category (AC) that needs to be prioritized is designated in the TF. If there is a terminal having data that is to be transmitted and has a priority higher than or equal to the priority of the designated AC, the terminal transmits the data to be transmitted, and if there is no terminal that has such data, data that is to be transmitted and has a lower priority than the priority of the designated AC is transmitted. Note that an AC can be designated as AC_BK (background), AC_BE (best effort), AC_VI (video), and AC_VO (sound), which are listed from the lowest priority.

When the number of terminals that exceeds the maximum number of users are connected to one access point (AP), the AP cannot allocate wireless resources to the terminals at a time. Therefore, the AP executes allocation of RUs again to terminals to which no wireless resources have been allocated in the first allocation, at another timing, for example. In such allocation of wireless resources, there are cases where a terminal having data that is to be transmitted and has a high priority cannot promptly transmit the data to be transmitted. In the technique described in U.S. Pat. No. 9,900,871 specification, when wireless resources are allocated, a terminal transmits high-priority data out of data to be transmitted, but such data cannot be transmitted if wireless resources are not allocated by the AP.

SUMMARY OF THE INVENTION

The present invention provides a technique for appropriately allocating wireless resources in accordance with the priority of data to be transmitted.

According to one aspect of the present invention, there is provided a communication apparatus comprising: an obtaining unit configured to obtain information regarding an access category of transmission data in each of a plurality of other communication apparatuses including a first communication apparatus and a second communication apparatus; an allocation unit configured to allocate wireless resources of OFDMA (Orthogonal Frequency Division Multiple Access) such that a transmission opportunity of the first communication apparatus does not precede a transmission opportunity of the second communication apparatus that has transmission data of a higher-priority access category than an access category of transmission data in the first communication apparatus; and a receiving unit configured to receive a signal that has been transmitted using OFDMA in accordance with allocation of wireless resources by the allocation unit and that conforms to an IEEE802.11 series standard.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 13 is a diagram showing an example of the correspondence relation between ACs and tone sizes.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Configuration of Wireless Communication System

Figure 1:
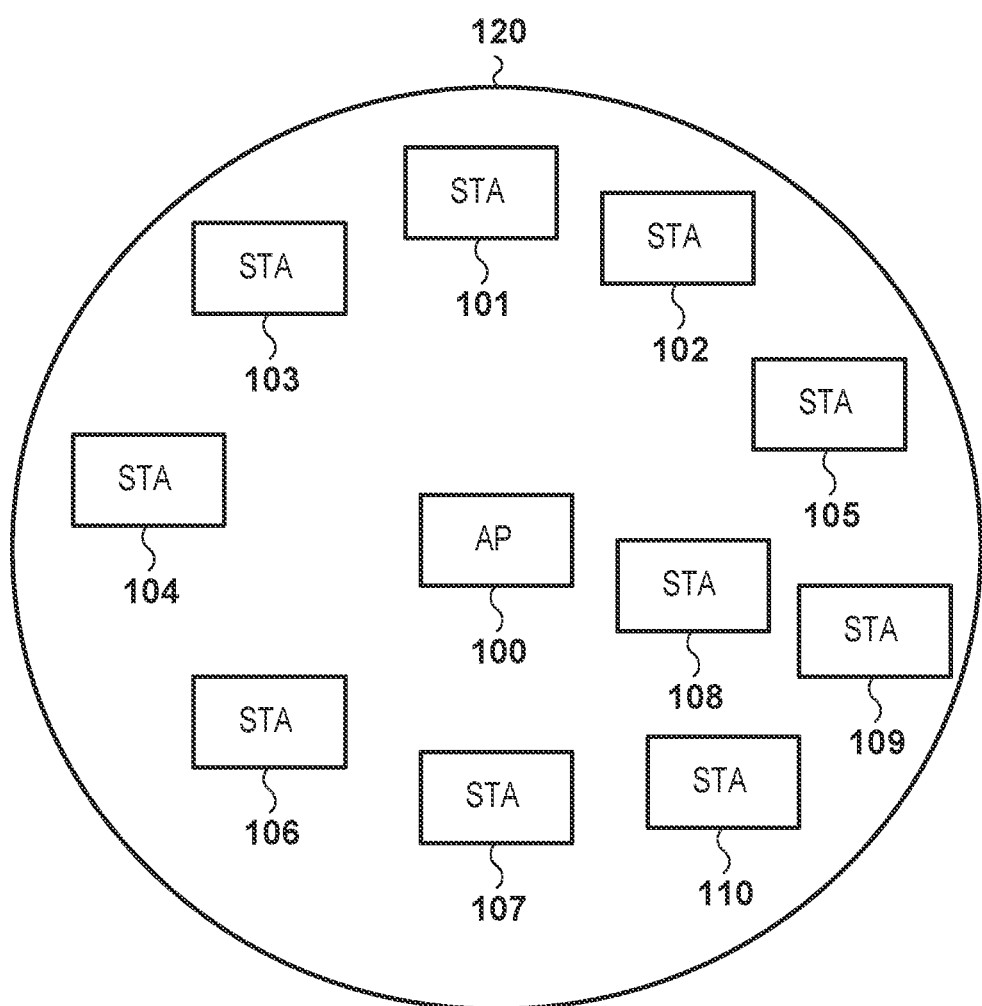
FIG. 1 is a diagram showing an example of a network configuration.

FIG. 1 shows a configuration example of a wireless communication system according to this embodiment. FIG. 1 shows a configuration in which the wireless communication system includes 10 terminals (STAs 101 to 110) and one access point (an AP 100). Note that the STAs 101 to 110 are HE (high efficiency) STAs that can operate in compliance with the IEEE802.11ax standard. In addition, the number of APs and the number of STAs are merely exemplary, and, for example, there may also be not more than nine STAs or 11 or more STAs, and there may also be two or more APs. In addition, here, as described above, each STA is an HE STA, but there may also be an STA that does not comply with IEEE802.11ax, but complies with another standard of the IEEE802.11 standard series. Note that the wireless communication system including STAs that comply with the IEEE802.11ax standard is exemplary, and the following argument can be applied to another standard of the IEEE802.11 standard series that has a feature similar to the feature of the IEEE802.11ax standard and any other wireless communication systems. A range 120 indicates a range in which the STAs can receive a signal transmitted from the AP, and the example in FIG. 1 indicates a state where a signal that is transmitted by the AP 100 can be received by all of the STAs (the STAs 101 to 110). In addition, in the embodiment below, a state is assumed in which authentication between the AP and each of the STAs has been successful, and data transmission/reception can be performed mutually.

In the example in FIG. 1, the STAs 101 to 110 perform UL (uplink) MU communication (multiuser communication) for the AP 100 receiving signals concurrently transmitted from the plurality of terminals using OFDMA (Orthogonal Frequency Division Multiple Access). Note that an uplink is a link in a direction in which a signal is transmitted from an STA to the AP 100. The STAs 101 to 110 each hold transmission data. Note that such transmission data has a transmission priority defined as an access category. For example, the STA 101 holds AC_VO data, the STAs 102 and the 103 hold AC_VI data, the STAs 104 to 109 hold AC_BE data, and the STA 110 holds AC_BK data. Note that "AC" is an acronym for "access category", VO indicates "voice", VI indicates "video", BE indicates "best effort", and BK indicates "background". The priority of AC_VO is the highest, followed by AC_VI, AC_BE, and AC_BK, which are listed from highest to lowest from left to right. Note that this priority order is exemplary, and this order may be changed in accordance with the circumstances.

In this embodiment, the AP 100 determines an allocation order of wireless resources (resource units, RU) to the STAs based on information regarding access categories (priority) of data of the STAs to be transmitted. Specifically, the AP 100 obtains information regarding access categories of data of the STAs to be transmitted, and allocates wireless resources for the STAs based on the information so as to first transmit high-priority data to be transmitted. Based on this, an STA having high-priority data that is to be transmitted can preferentially receive the allocation of wireless resources, and higher-priority data that is to be transmitted can reach the AP 100 earlier.

A configuration example of the AP 100 that performs such processing and an example of a flow of processing that is performed by the AP 100 will be described below in detail. Note that description will be given below assuming that the AP 100 is an access point that operates in compliance with the IEEE802.11ax standard, but there is no limitation thereto. For example, the AP 100 may also operate in compliance with any standards of the IEEE802.11 standard series in which it is possible to use the concept of access categories or priority similar to the access categories, or another wireless communication standard.

Configuration of AP 100

Figure 2:
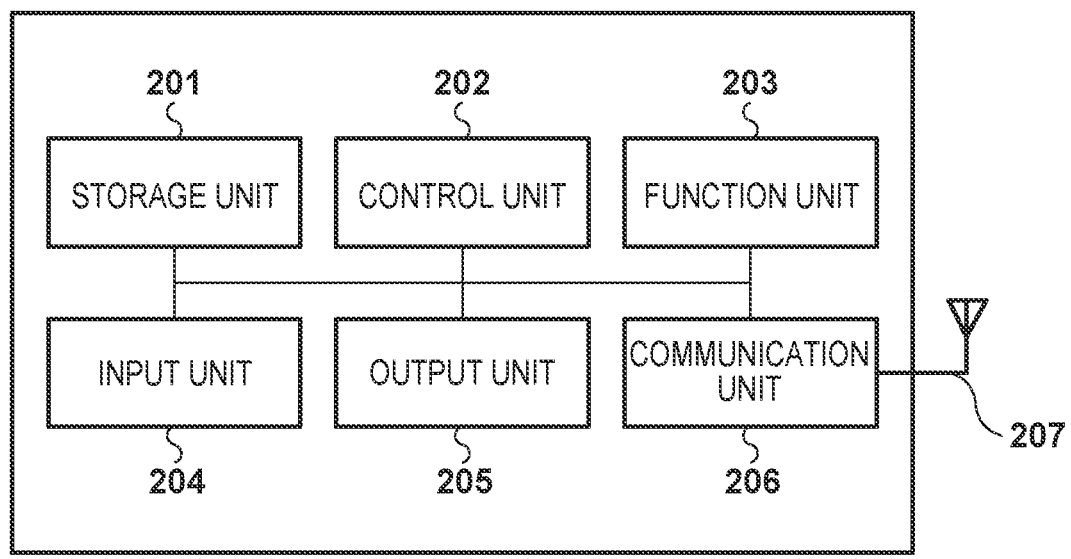
FIG. 2 is a diagram showing an example of the functional configuration of an AP.

FIG. 2 shows the hardware configuration of the AP 100 according to this embodiment. The AP 100 has, as its hardware constituent elements, a storage unit 201, a control unit 202, a function unit 203, an input unit 204, an output unit 205, a communication unit 206, and an antenna 207, for example. Note that the configuration in FIG. 2 is exemplary, and the AP 100 may also have only some of the constituent elements shown in FIG. 2, or may also have a constituent element other than those shown in FIG. 2. Note that the STAs 101 to 110 can have a similar configuration, but a description thereof is omitted here.

The storage unit 201 is constituted by one or more memories, that is, both or one of a ROM and a RAM, and stores programs for performing various operations to be described later and various types of information for wireless communication such as communication parameters. Here, ROM is an acronym for read-only memory, and RAM is an acronym for random access memory. Note that a storage medium such as a flexible disk, a hard disk, an optical disk, a magneto-optical disk, a CD-ROM, a CD-R, a magnetic tape, a non-volatile memory card, or a DVD may be used as the storage unit 201 besides memories such as the ROM and the RAM.

The control unit 202 is constituted by a processor such as a CPU or an MPU, an ASIC (application specific integrated circuit), a DSP (digital signal processor), and an FPGA (field programmable gate array). Here, CPU is an acronym for central processing unit, and MPU is an acronym for micro processing unit. The control unit 202 performs overall control of the AP 100 by executing a program stored in the storage unit 201. Note that the control unit 202 may also perform overall control of the AP 100 in cooperation with programs and an OS (operating system) stored in the storage unit 201.

In addition, the control unit 202 controls the function unit 203 so as to execute predetermined processes such as image capturing, printing, and projection. The function unit 203 is hardware for the AP 100 to execute such predetermined processes. For example, if the AP 100 is a camera, the function unit 203 is an image capturing unit, and performs a capturing process. Also, for example, if the AP 100 is a printer, the function unit 203 is a print unit, and performs a printing process. Also, for example, if the AP 100 is a projector, the function unit 203 is a projection unit, and performs a projection process. Data that is processed by the function unit 203 may be data stored in the storage unit 201, or data received from an STA via the communication unit 206 to be described later.

The input unit 204 receives various operations from the user. The output unit 205 performs various types of output to the user. Here, examples of output of the output unit 205 include at least one of display on a screen, sound output using a speaker, a vibrational output, and the like. Note that both the input unit 204 and the output unit 205 may be realized by one module as a touch panel.

The communication unit 206 controls wireless communication conforming to the IEEE802.11 standard series, or IP communication. In this embodiment, the communication unit 206 can execute processing conforming to at least the IEEE802.11ax standard. In addition, the communication unit 206 controls the antenna 207 so as to transmit/receive wireless signals for wireless communication. The AP 100 communicates with another communication apparatus via the communication unit 206 so as to transmit/receive contents such as image data, document data, and video image data.

Figure 3:
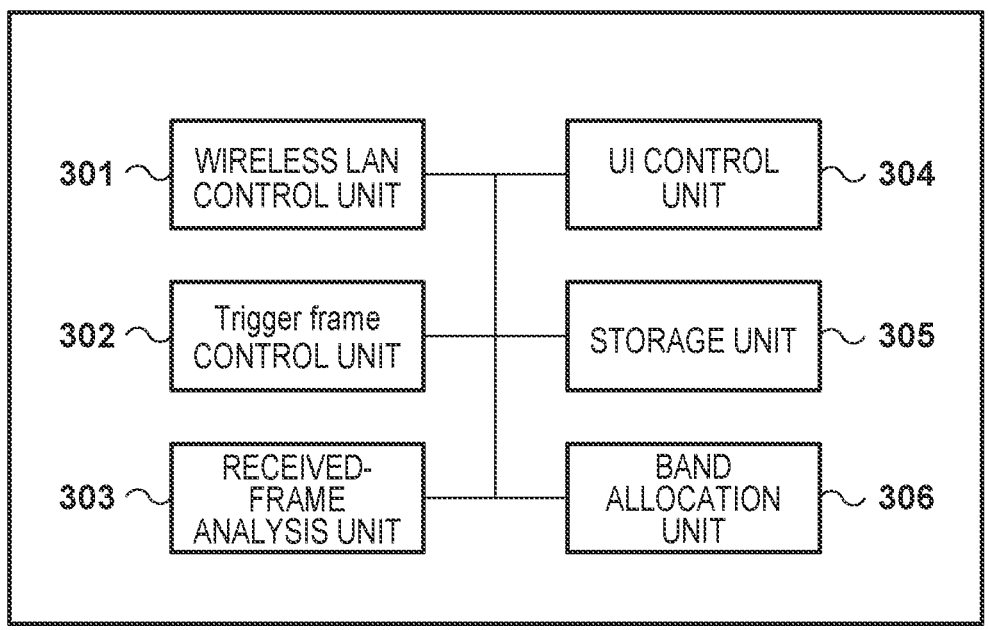
FIG. 3 is a diagram showing an example of the hardware configuration of the AP.

FIG. 3 is a block diagram showing an example of the functional configuration of the AP 100. The AP 100 includes, as its functional constituent elements, a wireless LAN control unit 301, a trigger frame control unit 302, a received-frame analysis unit 303, a UI control unit 304, a storage unit 305, and a band allocation unit 306, for example.

The wireless LAN control unit 301 executes control for transmitting/receiving wireless signals to/from another wireless LAN communication apparatus. The wireless LAN control unit 301 can be realized by programs for controlling a baseband circuit, an RF circuit, and an antenna for a wireless LAN, for example. The wireless LAN control unit 301 executes communication control of a wireless LAN in compliance with the IEEE802.11 standard series, and executes wireless communication with STAs conforming to the IEEE802.11 standard series.

The trigger frame control unit 302 performs control for transmitting a trigger frame to an STA that has been authenticated successfully, via the wireless LAN control unit 301. Upon receiving the trigger frame, the STA transmits an uplink (UL) frame in response to the frame. Upon receiving the UL frame via the wireless LAN control unit 301, the received-frame analysis unit 303 of the AP 100 interprets the content of the received UL frame. For example, if the received UL frame includes information regarding the AC, the received-frame analysis unit 303 obtains the information regarding an AC by analyzing it, and recognizes which AC is included in data to be transmitted of the STA that transmitted the UL frame.

The band allocation unit 306 determines the size of a frequency band to be allocated for data transmission of each of the STAs and the center frequency of the frequency band, and a period of time during which the frequency band is to be allocated, based on the information obtained by the received-frame analysis unit 303. In other words, the band allocation unit 306 determines a timing for allocation and a frequency range of wireless resources to be allocated to the STAs. The trigger frame control unit 302 notifies each of the STAs of information indicating the allocation determined by the band allocation unit 306, using a trigger frame, so as to cause the STA to transmit an UL frame in accordance with the allocation.

The UI control unit 304 is realized by a program or the like for controlling hardware related to an user interface for accepting an operation on the AP 100 from the user (not illustrated) of the AP 100, such as a touch panel and buttons. Note that the UI control unit 304 can also have a function for presenting information to the user, such as display of an image or the like or sound output. The storage unit 305 is a storage function that can be constituted by a ROM, a RAM, and the like for recording programs that are operated by the AP 100 and data.

Processing Flow

Figure 4:
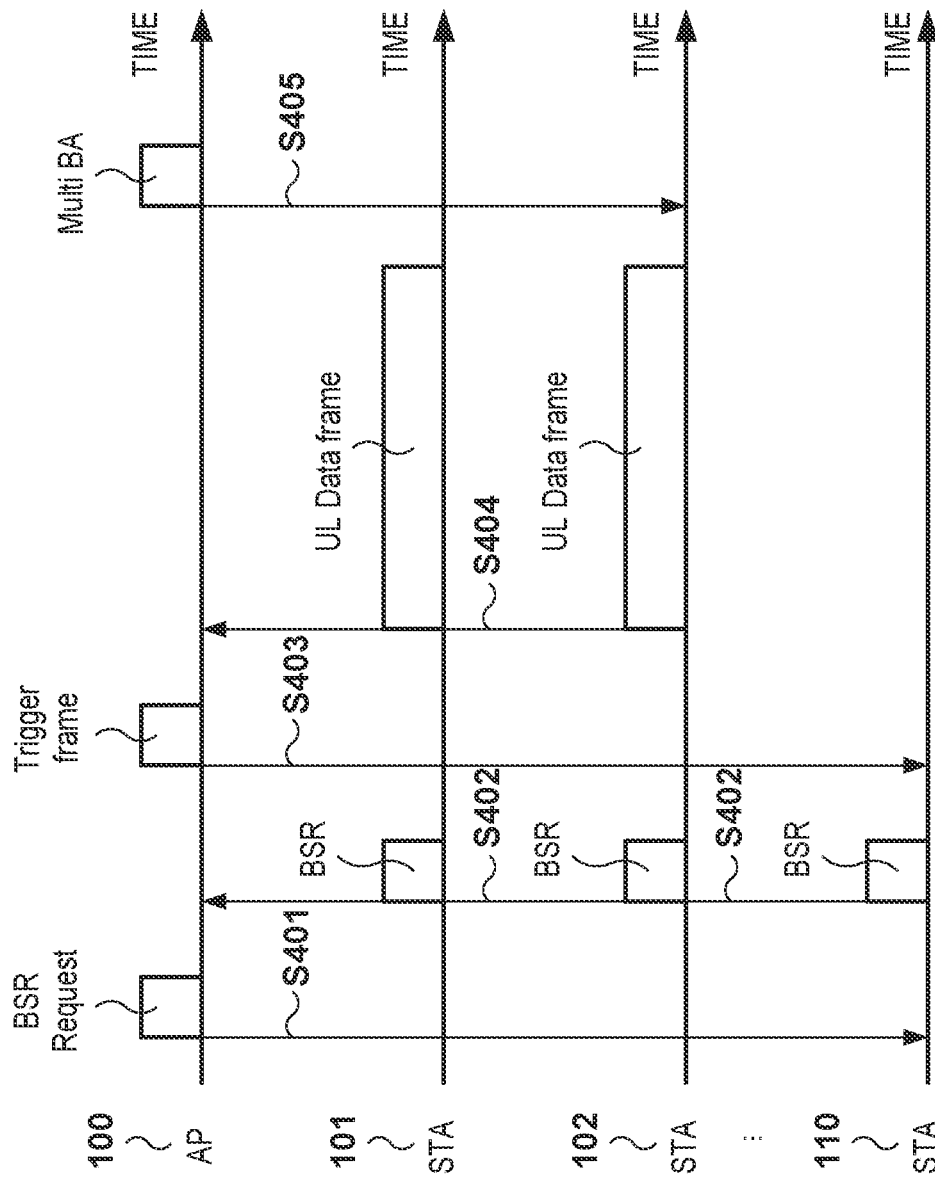
FIG. 4 is a diagram showing a basic flow of multiuser uplink communication in which a trigger frame is used.
Figure 5:
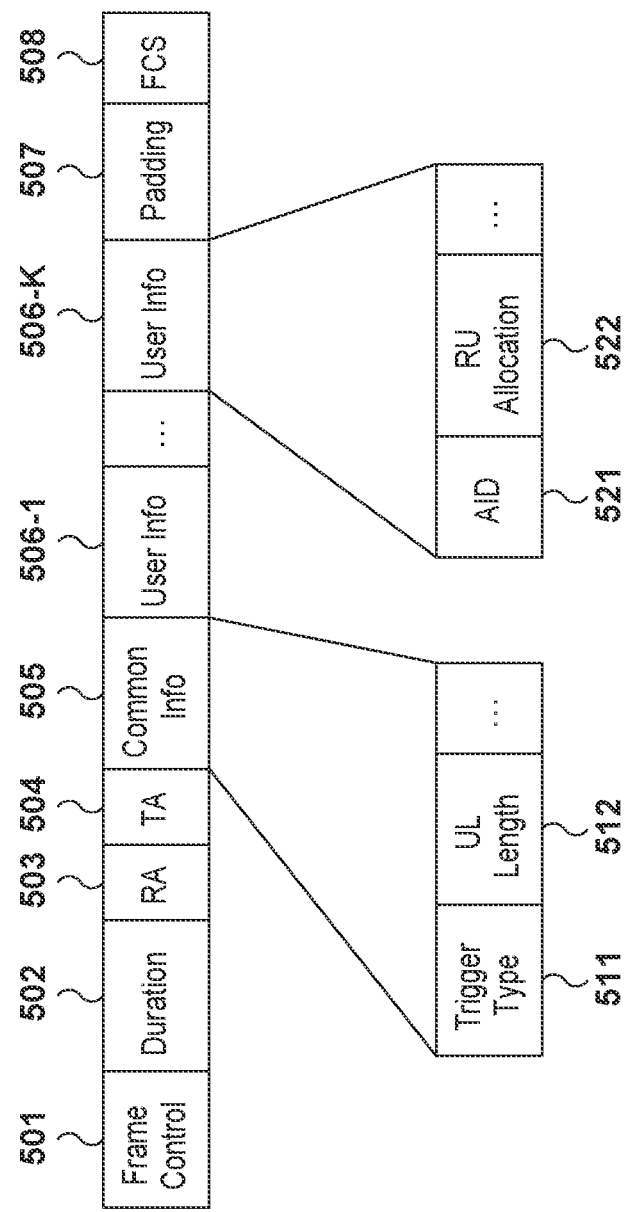
FIG. 5 is a diagram showing a configuration example of a trigger frame that is transmitted to STAs by the AP.

Subsequently, first, a basic flow of multi-user (MU) UL communication will be described with reference to FIG. 4. First, the trigger frame control unit 302 of the AP 100 transmits a buffer status report request (BSR request) (step S401). FIG. 5 shows a configuration example of a frame that is transmitted at this time. Note that description on fields that are not related to the description in this embodiment is omitted below.

In FIG. 5, a Frame Control field 501 is a field for storing a value indicating that the frame is a trigger frame of IEEE802.11ax, for example. A Common Info field 505 is a field for indicating information common with a plurality of terminals that are destinations of this trigger frame. User Info fields 506-1 to 506-K are fields for indicating individual information for the destinations of this trigger frame. The Common Info field 505 includes a Trigger Type sub-field 511 and an UL Length sub-field 512. The Trigger Type sub-field 511 is used for designating a type of a trigger. For example, regarding the BSR Request transmitted in step S401, the value of the Trigger Type sub-field 511 is set to 4. The UL Length sub-field 512 indicates the length of HE TB PPDU desired by the AP that has transmitted the trigger frame, when an STA responses to the trigger frame. Note that HE TB PPDU is an acronym for high efficiency trigger based PLCP protocol data unit. Also, PLCP is an acronym for physical layer convergence protocol. The User Info fields 506-1 to 506-K each include an AID sub-field 521 and an RU Allocation sub-field 522. These sub-fields will be described later.

Figure 6:
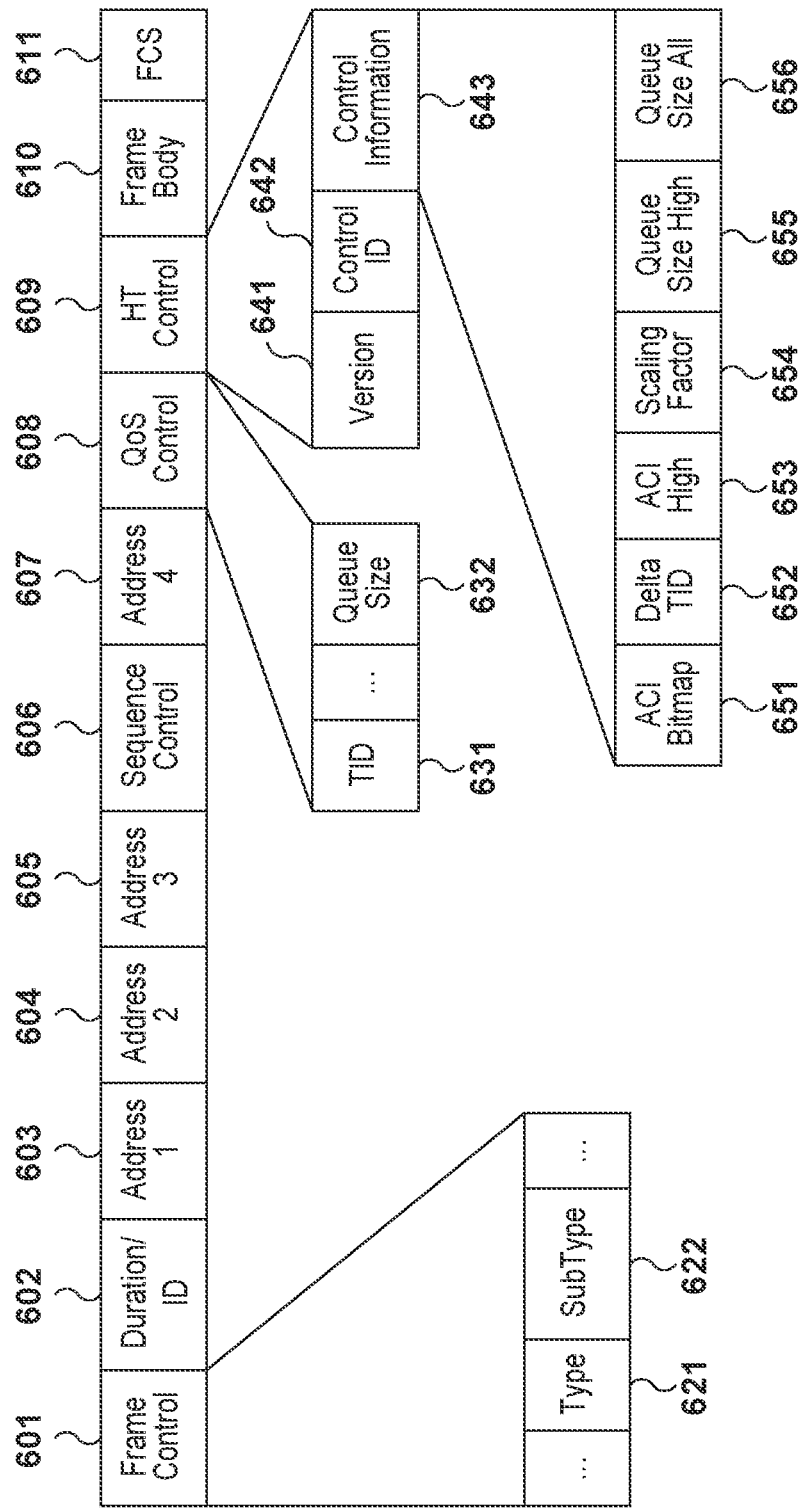
FIG. 6 is a diagram showing a configuration example of an UL data frame or a BSR transmitted to the AP by STAs.

Returning to FIG. 4, each STA transmits a buffer status report (BSR) (step S402). FIG. 6 shows an example of an UL frame that is transmitted at this time. A Frame Control field 601 indicates the type of the frame. For example, by setting the values in a Type sub-field 621 and a SubType sub-field 622 in the Frame Control field 601 to "11" and "00" respectively, it is indicated that the frame is a QoS Null frame. In addition, a TID sub-field 631 included in a QoS Control field 608 indicates an AC of data to be transmitted held by the STA that has transmitted the UL frame, and a Queue Size sub-field 632 indicates the size of the data to be transmitted. A value stored in the Queue Size sub-field 632 indicates the size of the data, of the AC indicated in the TID sub-field 631, that is to be transmitted and is being buffered by the STA. Note that the value that is stored in the Queue Size sub-field 632 is a value indicating the size (amount) of the data to be transmitted, increases by one for every 256 octets, and is expressed as a rounded-up value. For example, if the size of the data to be transmitted is 255 octets or smaller, it is expressed as "1", and if the size of the data to be transmitted is 256 to 511 octets, it is expressed as "2".

Figure 7:
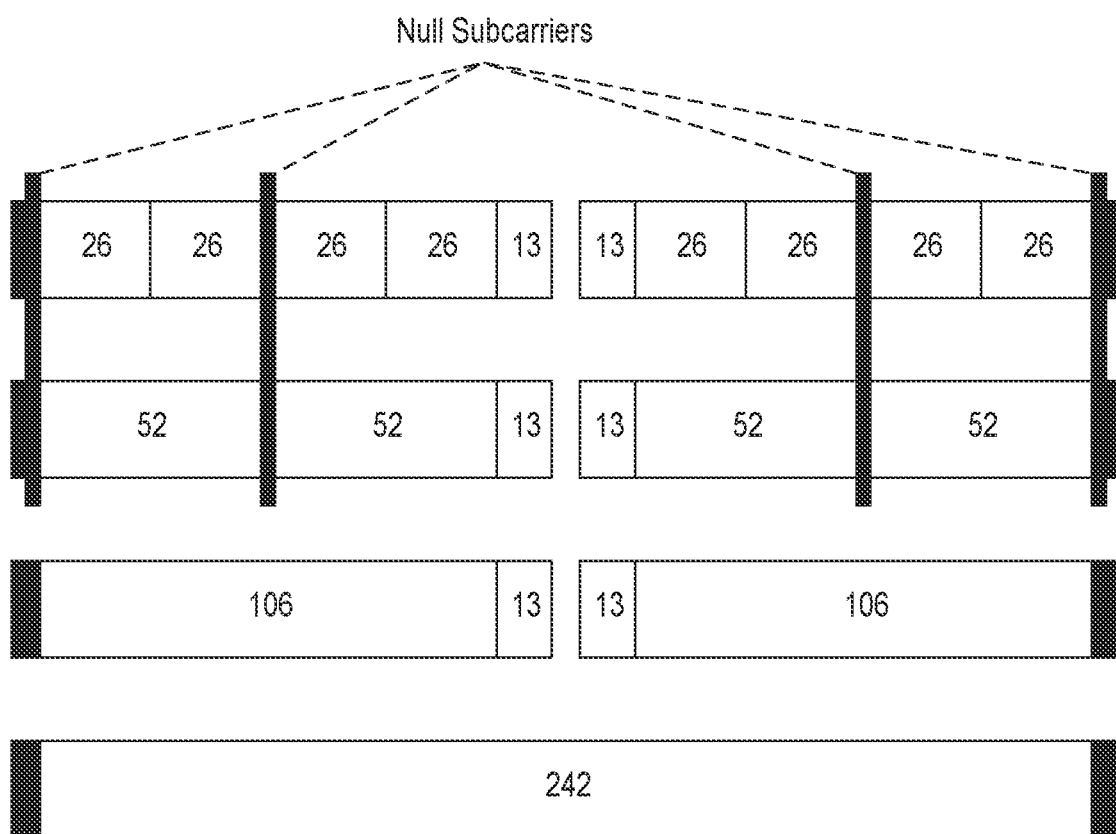
FIG. 7 is a diagram showing an example of allocation of tone sizes for 20 MHz.

Upon receiving a BSR from each STA, the AP 100 transmits a trigger frame for prompting transmission of UL data based on information in the BSR (step S403). The frame that is transmitted at this time also has the format in FIG. 5, for example. At this time, "0" is stored in the Trigger Type sub-field 511. Also, the UL Length sub-field 512 stores a value that corresponds to a communication period common with all of the STAs, and this value indicates the amount of data that can be transmitted by each of the STAs. If the value of the Trigger Type sub-field 511 is "0", the User Info fields 506-1 to 506-K are added to the frame in FIG. 5. In each of the User Info fields 506-1 to 506-K, an STA is specified in the AID sub-field 521, and an RU and a tone size that are allocated to the STA are specified in the RU Allocation sub-field 522. Note that a tone size refers to a value indicating the size of a frequency band that can be allocated to each STA. FIG. 7 shows an example of tone sizes and the sizes of frequency bands that are allocated, in a case of 20 MHz. For example, in the example of the uppermost row, it is indicated that a 20 MHz bandwidth is divided into nine frequency bands whose tone size is 26, and frequency resources are allocated in units of these divided blocks. On the other hand, in the example of the lowermost row, the 20 MHz bandwidth is not divided, and frequency resources are allocated to one STA in one block whose tone size is 242. Note that tone sizes can also be allocated similarly in the cases of 40 MHz and 80 MHz.

Upon receiving the trigger frame, each STA transmits an UL data frame within the range of the data amount determined in accordance with the UL Length sub-field 512 of the trigger frame (step S404). Upon receiving PPDU from each STA, the AP 100 transmits multi-block Ack (multi BA) as receipt acknowledgement (step S405).

Note that each STA may transmit a BSR to the AP 100 at any timing. Accordingly, a data frame that is transmitted as UL data to the AP 100 may also include information to be notified using the BSR. In addition, the AP 100 may also read data equivalent to a BSR, based on the UL data transmitted from each STA. For example, in a frame conforming to QoS, data is stored in a Frame Body field 610 in the format in FIG. 6, and the frame is transmitted. At this time, the QoS Control field 608 indicates TID corresponding to the data stored in the Frame Body field 610 and "Queue Size" held by the STA. The AP 100 can handle the values stored in the TID sub-field 631 and the Queue Size sub-field 632 of the QoS Control field 608, as information acquired using the BSR.

Also, information in the BSR may also be transmitted using other fields. For example, information in the BSR can also be transmitted using an HT Control field 609 in FIG. 6. For example, a Version sub-field 641 in the HT Control field 609 indicates that the frame is a frame of IEEE802.11ax. In addition, by a value in a Control ID sub-field 642 in the HT Control field 609 being set to "3", for example, it is indicated that the type of control is BSR control. The following information is written in a Control Information sub-field 643. Specifically, an ACI Bitmap sub-field 651 indicates all of the ACs of data held by the STA that transmitted this frame. A Delta TID sub-field 652 indicates the total number of TIDs of the data held by the STA that transmitted this frame, and an ACI High sub-field 653 indicates an AC whose queue size is largest. A Scaling Factor sub-field 654 indicates the scale of the queue size, and, an order indicated by the next queue size is determined based on the scale of the queue size. A Queue Size High sub-field 655 and a Queue Size All sub-field 656 respectively indicate a queue size value of an AC whose queue size is large and a queue size value acquired by totaling all of the pieces of data. In this manner, each STA can inform the AP of the amount of data that is held regarding each AC.

Subsequently, several examples of processing for allocating wireless resources that is performed by the AP 100 will be described.

Processing Example 1

In this processing example, the AP 100 allocates RUs in order from a high-priority STA according to the values of access categories of data held by a plurality of STAs. Accordingly, the AP 100 can preferentially receive data of a high-priority access category. Note that this processing is realized, for example, by the control unit 202 executing a program stored in the storage unit 201.

Figure 8:
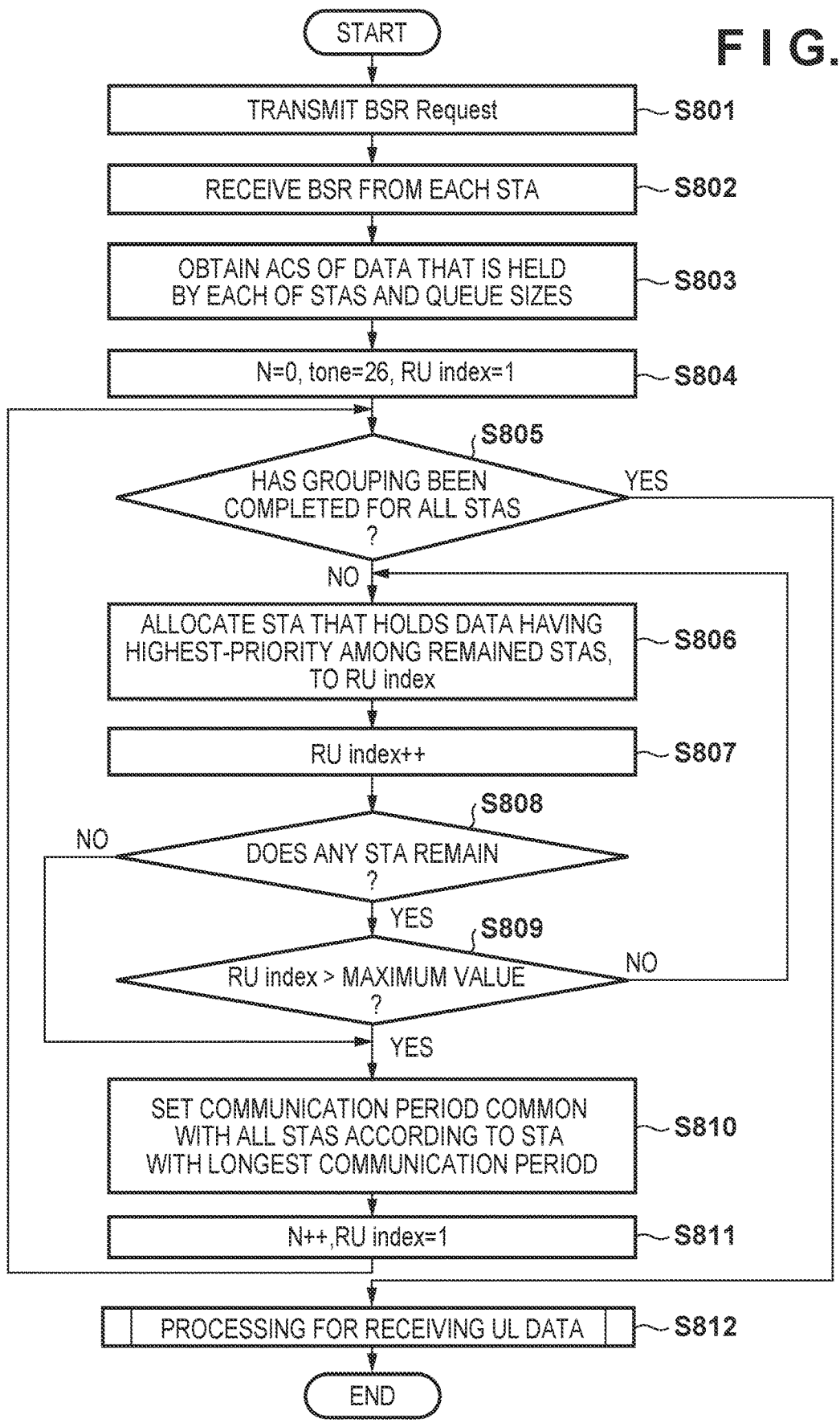
FIG. 8 is a diagram showing a first example of a flow of allocation of wireless resources, which is performed by the AP.

FIG. 8 shows an example of a flow of processing for the AP 100 to execute MU UL communication. Note that this processing is started when the AP 100 executes MU UL communication, and is not executed when single user communication is being performed. However, there is no limitation thereto, and, for example, even while MU communication is not being performed, processing for periodically receiving BSRs and the like may be performed.

First, the AP 100 transmits a BSR request as a trigger for receiving a BSR from the STAs (step S801). The frame that is transmitted at this time is, for example, a frame indicating that it is a BSR request, in the format shown in FIG. 5 as described above. The AP 100 then receives a BSR from each STA that received the trigger frame (step S802). The frame that is received at this time is a frame in the format shown in FIG. 6, as described above. The AP 100 obtains ACs of data that is to be transmitted and is held by each of the STAs and queue sizes for the respective ACs, from the received BSR using the received-frame analysis unit 303 (step S803). The AP 100 executes allocation of wireless resources based on the information obtained using this BSR. Note that, in the following description, assume that N denotes a group number, a tone size allocated to each STA is set to 26, and an RU index takes a value from 1 to the maximum value. Note that the RU index is information for designating an RU that is allocated, and different RUs are respectively associated with each of the values of RU indexes. The maximum value of the RU index is the number of RUs that can be allocated in one transmission opportunity, and is, for example, 9 if the tone size is 26 for a 20 MHz bandwidth. In addition, a group denoted by N refers to a group of STAs to which wireless resources are allocated at the same timing. Specifically, two STAs belonging to different groups N perform UL communication at different timings. Before allocation of wireless resources, the AP 100 initializes the group number N to 0, and the RU index to 1 (step S804).

First, in a state where no RU has been allocated to any STA and grouping has not been performed (NO in step S805), the AP 100 allocates an STA that holds data having the highest-priority AC out of all of the STAs, to an RU index of 1 (step S806). Accordingly, an RU whose RU index is 1 for N=0 is allocated to this STA. The RU index is then incremented to 2 (step S807), and, if there is the next STA (YES in step S808), the AP 100 determines whether or not the incremented RU index exceeds a maximum value (step S809). At this time point, the RU index equals 2, and does not exceed the maximum value (9 if a band of 20 MHz is used) (NO in step S809), and thus the procedure returns to step S806. In step S806, an STA that holds data that is to be transmitted and has the highest-priority AC from among STAs to which no RU has been allocated (the remaining STAs) is allocated to the RU index incremented in step S807 (step S806). Note that, if a plurality of STAs have data that is to be transmitted and have the same AC, an STA to which an RU is to be allocated is selected from those STAs. This selection may be performed in accordance with a predetermined rule such as a rule for giving priority to an STA itself having a high priority, an STA whose AID is smallest/largest from among a plurality of STAs, or an STA whose MAC address is smallest/largest, but random selection may also be performed.

In this manner, while there are STAs to which no RU has been allocated, those STAs are allocated to different RU indexes in order. If the RU index incremented in step S807 exceeds the maximum value (YES in step S809), the AP 100 ends RU allocation in the current group. In addition, also when there is no STA to which no RU has been allocated during RU allocation (NO in step S808), the AP 100 ends RU allocation in the current group. The AP 100 then specifies communication periods respectively for one or more STAs in the current group to each of which an RU has been allocated, based on the queue size, and sets a communication period common with all of the STAs in this group according to the specified communication periods (step S810). For example, a configuration may be adopted in which the AP 100 specifies communication periods until reception of data having the amount indicated by a queue size is complete, respectively for one or more STAs, and sets the longest communication period among the specified communication periods, as the communication period common with all of the STAs. After that, the AP 100 increments the group number N, resets the RU index to 1 (step S811), and returns the procedure to step S805. In step S809, if it is determined that the RU index exceeds the maximum value in a state where there are STAs to which no RU has been allocated, the AP 100 allocates RUs to the remaining STAs similarly to the above-described processing, in the next group. When RU allocation to all of the STAs is complete (YES in step S805), the AP 100 receives UL data from the STAs by transmitting a trigger frame for notifying the allocation (step S812).

For example, as described above, assume that the STA 101 holds data of AC_VO, the STAs 102 and 103 hold data of AC_VI, the STAs 104 to 109 hold data of AC_BE, and the STA 110 holds data of AC_BK. In this case, an RU whose tone size corresponding to the RU index of 1 for the group N=0 is 26 is allocated to the STA 101 that holds data having the highest-priority AC. Subsequently, RUs whose tone size corresponding to RU indexes of 2 and 3 for the group N=0 is 26 are allocated to the STAs 102 and the 103 that hold data having the second highest-priority AC. In a similar manner, RUs whose tone size corresponding to RU indexes of 4 to 9 for the group N=0 is 26 are allocated to the STAs 104 to 109 that hold data having the third highest priority AC. On the other hand, when using a 20 MHz bandwidth, the maximum value of the RU index is 9. Therefore, no RU is allocated to the STA 110 that holds data having the lowest priority AC for the group N=0, and an RU whose tone size corresponding to an RU index of 1 is 26 is allocated to the STA 110, for the next group N=1.

Figure 9:
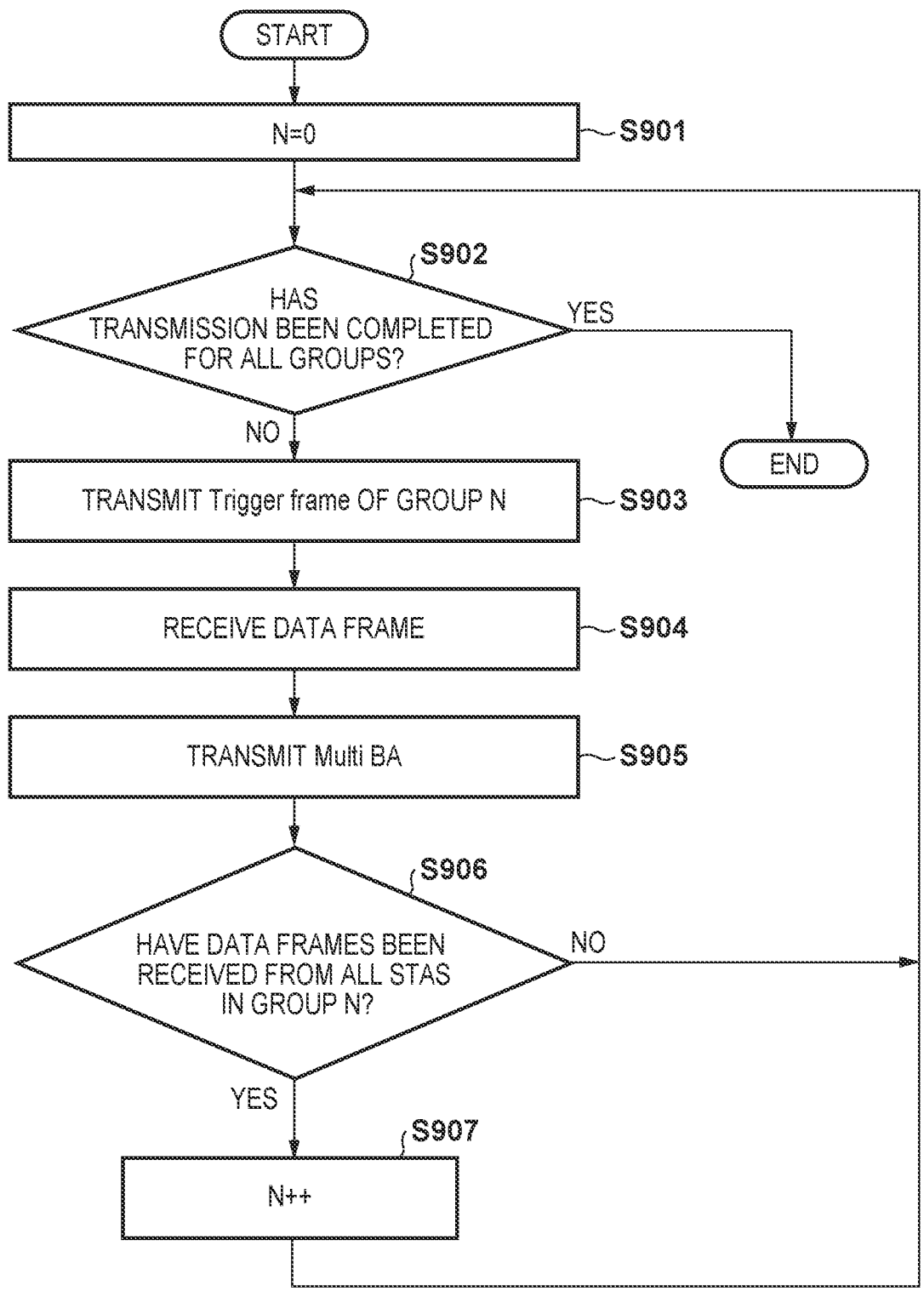
FIG. 9 is a diagram showing a first example of a flow of UL data receiving processing.

An example of processing for receiving UL data, which is executed by the AP 100, will be described with reference to FIG. 9.

The AP 100 first initializes the group number N to 0 (step S901). The AP 100 then transmits a trigger frame to STAs belonging to the group N=0, in the format as shown in FIG. 5 (step S903). Note that, in the trigger frame that is transmitted at this time, "AID" indicating STAs belonging to the group N=0 and "RU Allocation" indicating the positions of RUs to be used by the STAs are written. Each of the STAs belonging to the group N=0 transmits a data frame in accordance with allocation written in this trigger frame. Upon receiving the data frame from each STA (step S904), the AP 100 returns multi block Ack (Multi BA) to the STA (step S905). The STA can confirm whether or not the transmitted data frame has been properly received by the AP 100, by receiving the multi block Ack. If data frames are received from all of the STAs belonging to the group N=0 (YES in step S906), the AP 100 increments N (step S907), and repeats similar processing on STAs belonging to the next group. Note that, if there is no group corresponding to the incremented value N, in other words, if UL data frame have been received from all of the groups (YES in step S902), the processing in FIG. 9 ends. On the other hand, if there is any group from which a data frame has not been received yet (NO in step S902), the AP 100 repeatedly executes processes of step S903 onward on the next group.

Note that, if it is determined that data frames have not been received from all of the STAs belonging to a group (NO in step S906), the AP 100 can repeat processes from step S903 onward for the group, until data frames are received from all of the STAs. Note that, if it is determined that data frames have not been received from all of the STAs belonging to a group (NO in step S906), the AP 100 may execute processing for allocating RUs again as in step S1001 in FIG. 10. In reallocation processing of step S1001, the processing in FIG. 8 is performed again. Accordingly, if reception of data having a high-priority AC fails, instead of waiting for receiving low-priority data in this state, the AP 100 allocates wireless resources for retransmission of high-priority data, and can thereby prompt retransmission of the data. As a result, it is possible to efficiently and reliably receive data of a high-priority AC. By determining RU allocation based on an STA that has data of a high-priority AC in this manner, the AP can preferentially receive data of a high-priority AC.

In addition, a case is envisioned in which, while the AP 100 is waiting for processing of MU UL communication after receiving BSRs, new data to be transmitted arises in an STA. In this case, the value of the queue size in the received BSR and the value of (the data amount in the received data frame)+(the queue size in a QoS field) are different. Therefore, the AP 100 may also execute reallocation processing based on these changed pieces of information, as shown in FIG. 11.

Figure 11:
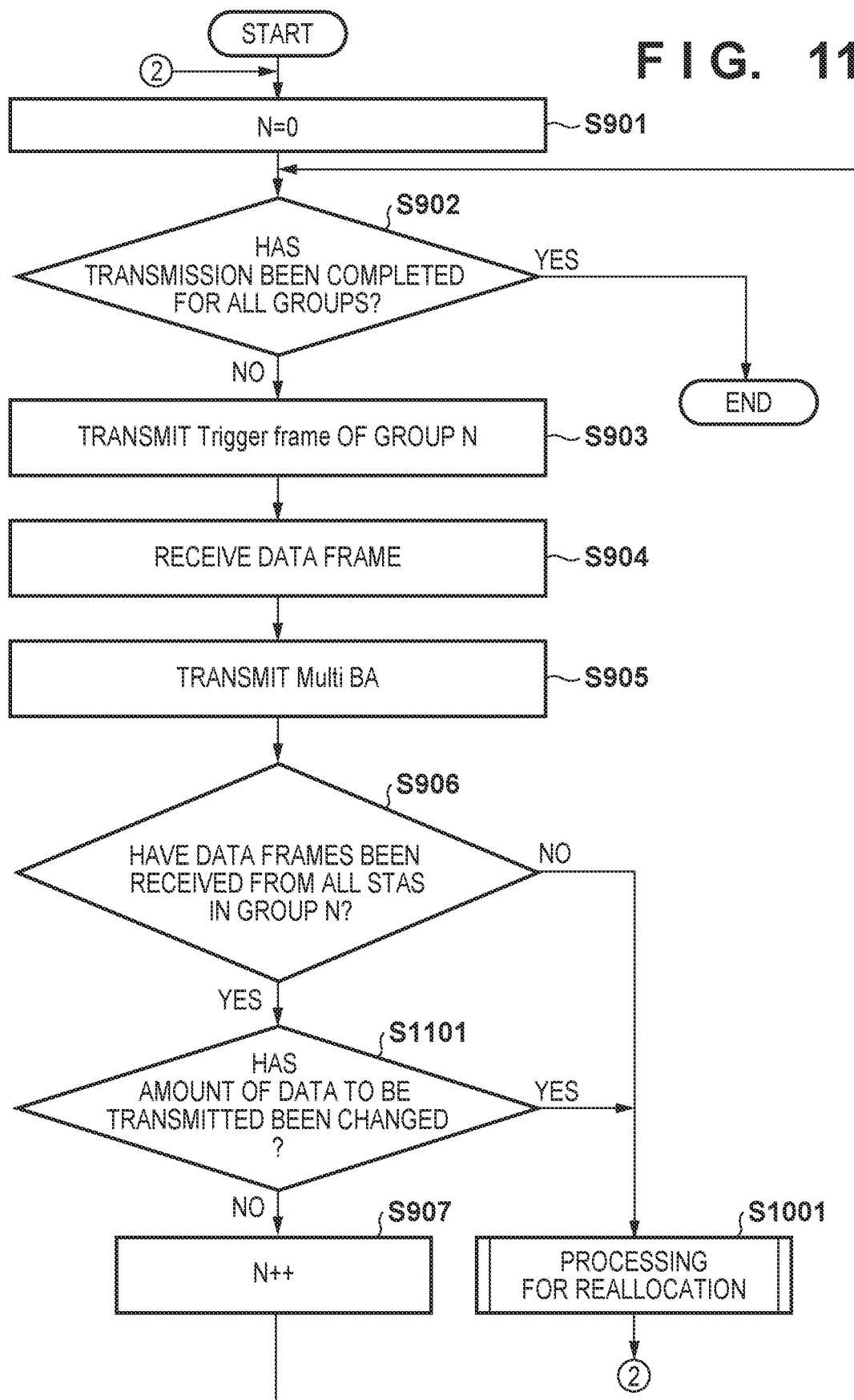
FIG. 11 is a diagram showing a third example of a flow of UL data receiving processing.

In FIG. 11, if data frames have been received from all of the STAs in the group N (YES in step S906), the AP 100 analyzes the QoS field in a data frame transmitted by each of the STAs. The AP 100 then compares the value of the queue size in this QoS field with a value acquired by adding the received data amount to the queue size in the QoS field of previously received data frame. If it is determined that two values are different as a result of this comparison, the AP 100 determines that the amount of data to be transmitted has changed in an STA (YES in step S1101), and rewrites information received in the BSR with information acquired by analyzing the data frame. The AP 100 then executes allocation processing again based on the overwritten information (step S1001). Accordingly, even if the amount of data to be transmitted changes in an STA, RU allocation can be executed flexibly. Note that a configuration may be adopted in which, based on the AC of data to be transmitted, the AP 100 performs RU reallocation if new data of AC_VO or AC_VI arises, and does not perform RU reallocation even if new data of AC_BE or AC_BK arises, for example. Based on this, when high-priority data arises, the AP 100 can perform reallocation for preferential transmission of the data. On the other hand, reallocation is not immediately performed if low-priority data arises, and thereby it is possible to prevent reallocation from being frequently performed, and to improve the system stability.

Note that, in the example in FIG. 8, the AP 100 executes processing for receiving a data frame (FIGS. 9 to 11) after allocating RUs to all of the STAs, but there is no limitation thereto. The AP 100 may also execute processing for receiving a data frame (FIGS. 9 to 11) when allocation for one group is complete (when the procedure advances to step S811 in FIG. 8). By combining processing for receiving data frames when such allocation for one group is complete and reallocation processing shown in FIGS. 10 and 11, RUs can be allocated flexibly while suppressing the processing time to be short.

In addition, in above-described example, an example of a case where the tone size is fixed to 26 has been described, but there is no limitation thereto. For example, allocation may also be performed with the tone size of 52. In this case, when using a bandwidth of 20 MHz, the maximum number of STAs allocated to one group is four. Therefore, the AP 100 may change the tone size in accordance with the number of STAs that are performing data communication with the AP 100, and the number of STAs that hold transmission data. For example, a configuration may also be adopted in which the AP 100 sets the tone size to 52 when the number of STAs that hold transmission data is eight, and sets the tone size to 26 when the number of STAs that hold transmission data changes to nine. Accordingly, the STAs can transmit a larger volume of data to the AP 100 in one transmission opportunity while using a band efficiently.

In addition, in the above-described example, the AP 100 does not perform any other operation until RU allocation and data frame reception are complete for all of the STAs, but another operation may also be performed. For example, another frame may also be transmitted/received between these processes. For example, processing for transmitting a BSR request may also be performed when, although reception of data frames from a group including STAs that hold data of AC_VO and AC_VI is complete, but reception of data frame from another group is not complete. Accordingly, it is possible to promptly recognize that there is a STA that holds data that need to be transmitted in preference to data of AC_BE, and to prompt the STA to transmit the data.

Processing Example 2

Figure 12:
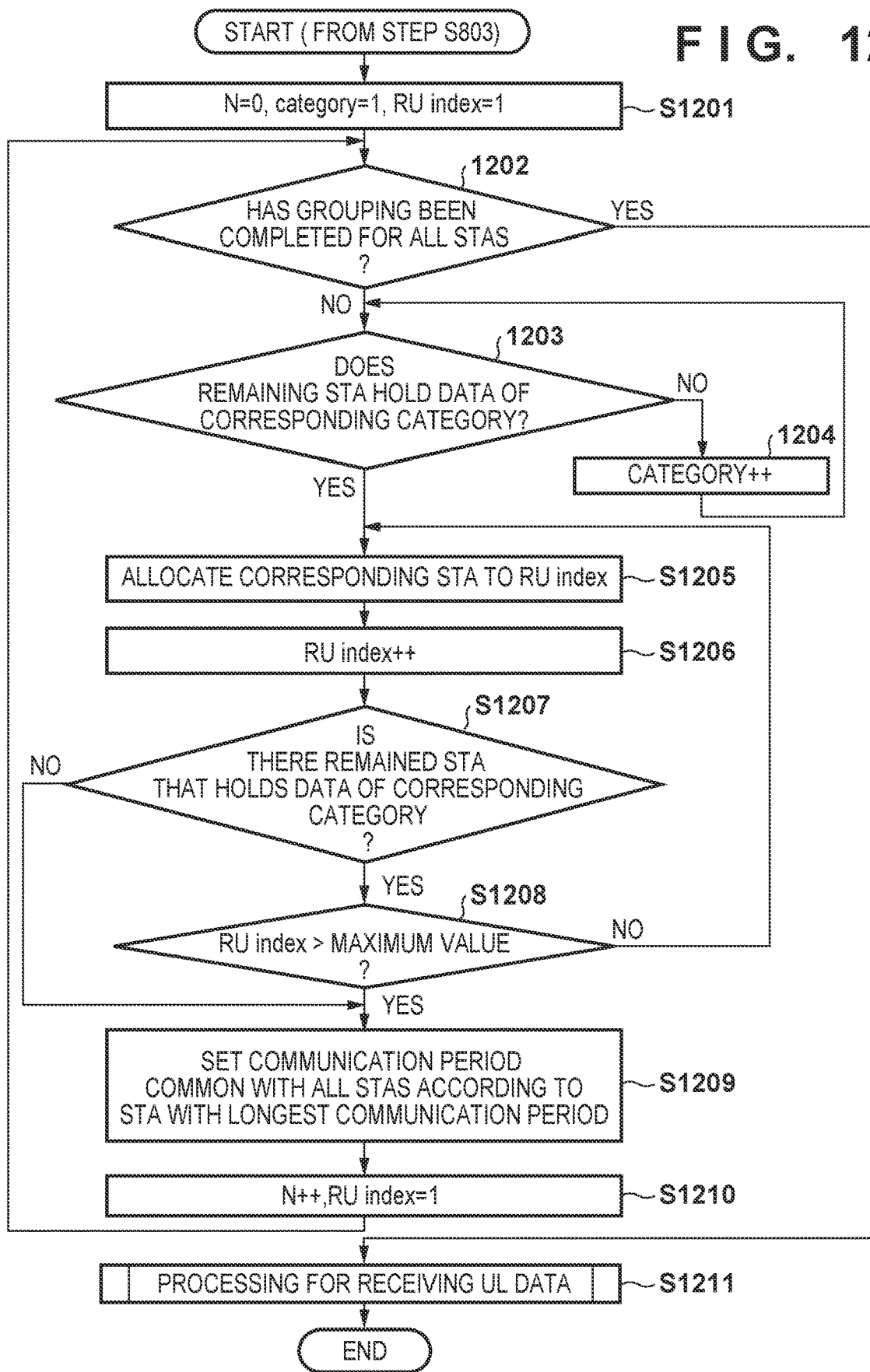
FIG. 12 is a diagram showing a second example of a flow of allocation of wireless resources, which is performed by the AP.

In this processing example, the AP 100 changes the tone size for each AC. Accordingly, data having a higher-priority AC can be received at an earlier time. FIG. 12 shows an example of a flow of processing for the AP 100 to execute MU UL communication. Note that, in this processing, first, processes of steps S801 to S803 in FIG. 8 are performed, but they are not illustrated here.

In this processing example, a group number, a category number (category), and an RU index are used as parameters in the processing. The group number N and the RU index are similar to those in Processing Example 1. On the other hand, the category number is a number indicating an AC, where a category number of 1 corresponds to AC_VO, a category number of 2 corresponds to AC_VI, a category number of 3 corresponds to AC_BE, and a category number of 4 corresponds to AC_BK. In addition, in this processing example, the AP 100 determines tone sizes respectively for these categories, and allocates RUs having the determined sizes. FIG. 13 shows an example of the relationship between category and tone size. For example, the AP 100 allocates an RU having a tone size of 242 to an STA that holds data whose category number is 1 (AC is AC_VO). Also, the AP 100 allocates an RU having a tone size of 106 to an STA that has data whose category number is 2 (AC is AC_VI). However, these values are merely exemplary, and other tone sizes may also be used. For example, the AP 100 may also assign an RU having a tone size of 106 to an STA that has data of AC_VO. Note that, at this time, a configuration may also be adopted in which a tone size in a range that does not exceed tone sizes defined for the respective categories as shown in FIG. 13 is used.

In this processing, first, in initialization processing, N is initialized to 0, the category number is initialized to 1, and the RU index is initialized to 1 (step S1201). The AP 100 then confirms whether or not there is an STA that holds data of a category number of 1 (AC_VO) among STAs to which no RU has been allocated (step S1203). If there is no STA that holds data of a category number of 1 (NO in step S1203), the AP 100 increments the category number, and changes a target category number (step S1204). The AP 100 then confirms whether or not there is an STA that holds data of a category number of 2 (AC_VI). The AP 100 repeats this processing until it is determined that there is an STA that holds data of the target category number. If it is determined that there is an STA that holds data of the target category number (YES in step S1203), the AP 100 allocates the STA to the RU index (step S1205), and increments the RU index (step S1206). The AP 100 then determines whether or not there is an STA that has not allocated to an RU index among STAs that have data of the target category number (step S1207). If it is determined that there is such an STA (YES in step S1207), the AP 100 determines whether or not the RU index incremented in step S1206 exceeds the maximum value (step S1208). Note that, in this processing example, as shown in FIG. 13, a tone size corresponding to the target category number has been defined, and thus the maximum value of the RU index corresponding to this is used in the determination in step S1208. Specifically, the determination in step S1208 is performed with the maximum value of the RU index for AC_VO being set to 1, the maximum value of the RU index for AC_VI being set to 2, the maximum value of the RU index for AC_BE being set to 4, and the maximum value of the RU index for AC_BK being set to 9.

Figure 10:
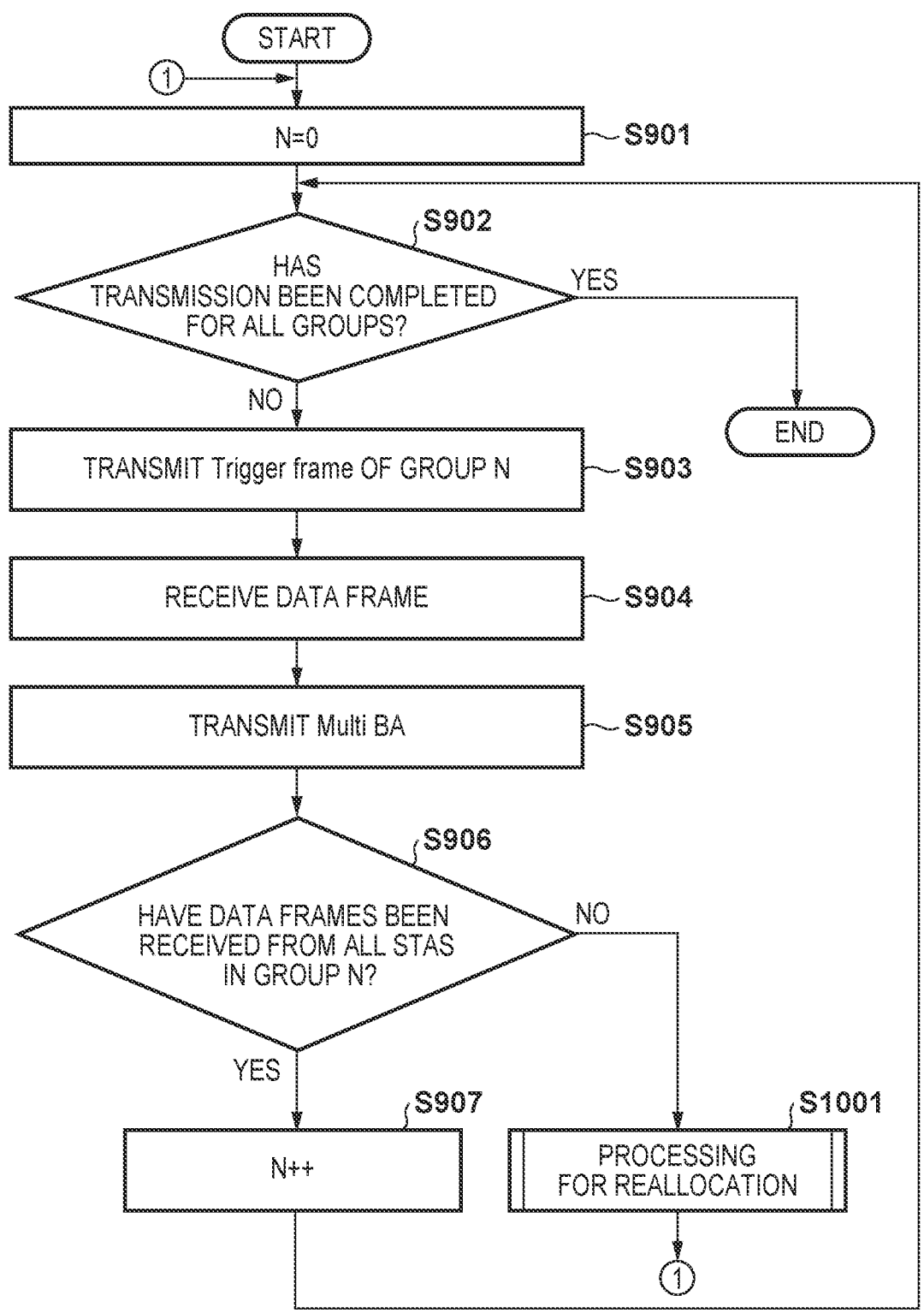
FIG. 10 is a diagram showing a second example of a flow of UL data receiving processing.

If the value of the RU index does not exceed the maximum value (NO in step S1208), the AP 100 returns the procedure to step S1205. On the other hand, if the value of the RU index exceeds the maximum value (YES in step S1208), the AP 100 ends RU allocation for the current group, and, within the group, sets a common communication period for an STA whose communication period is long (step S1209). The AP 100 then increases the group number by one, and returns the RU index to 1 (step S1210). These processes are repeated until all of the STAs are allocated to RU indexes of any group (RUs are allocated to all of the STAs). After allocating RUs to all of the STAs (YES in step S1202), the AP 100 performs UL data receiving processing (step S1211). Note that the processing of step S1211 is performed as shown in FIGS. 9 to 11 described above, but the description thereof is not repeated here.

In this processing example, for example, in the group N=0, an RU having a tone size of 242 is allocated to the STA 101 that hold data in which AC is AC_VO. Then, in the group N=1, RUs having a tone size of 106 are allocated to the STAs 102 and 103 that hold data in which AC is AC_VI. In addition, in the group N=2, RUs having a tone size of 52 are allocated to the STAs 104 to 107 that hold data in which AC is AC_BE. Also, in the group N=3, similarly, RUs having a tone size of 52 are allocated to the STAs 108 and 109 that hold data in which AC is AC_BE. At last, in the group N=4, an RU having a tone size of 26 is allocated to the STA 110 that hold data in which AC is AC_BK. In this manner, data pieces of different ACs are transmitted in different transmission opportunities. Based on this, an early transmission opportunity is given to data of a high-priority AC, and the AP 100 can complete reception of such data of a high-priority AC early.

In this processing example, the AP 100 assigns a wider band (a larger tone size) in order to transmit data of a high-priority AC, and thus can complete reception of data of a high-priority AC early compared with Processing Example 1. Accordingly, even if data from an STA could not be received, the AP 100 can prompt retransmission to the target STA early compared with Processing Example 1 by performing processing in FIG. 10 or processing in FIG. 11. As a result, processing to reception confirmation can be completed at an earlier time regarding an STA that holds data of a high-priority AC.

Note that, in this processing example, as shown in FIG. 13, a tone size is fixed for each AC, but this tone size may be variable. For example, the AP 100 can determine a tone size in accordance with the number of STAs that hold data of the same AC. In this case, if there are two STAs that hold data of AC_VO, the AP 100 can end data transmission of these STAs in one transmission opportunity by allocating RUs having a tone size of 106 to these STAs. Similarly, if there are four STAs that hold data of AC_VI, the AP 100 can allocate RUs having a tone size of 52 to these STAs.

In addition, during RU allocation, if there is an RU that has not been allocated to any STA in each group, the AP 100 may allocate this RU to an STA that holds data of a low-priority AC. For example, consider a case where there is one STA that holds data of AC_VI, and there are five STAs that hold data of AC_BE. In such a case, if this processing example is applied as is, RUs having a tone size of 106 are allocated to STAs that hold data of AC_VI in the group N=0. Also, RUs having a tone size of 52 are allocated to four STAs that hold data of AC_BE in the group N=1, and an RU having a tone size of 52 is allocated to one STA in the group N=2. However, in this case, in the group N=0, one RU having a tone size of 106 remains, and, in the group N=2, three RUs having a tone size of 52 remain. In contrast, by allocating RUs having a tone size of 106 to two STAs in the group N=0, and allocating RUs having a tone size of 52 to four STAs in the group N=1, it is possible to more efficiently use wireless resources. In addition, the AP 100 may allow the same group to include a plurality of STAs that hold data of different types of ACs, while maintaining tone sizes corresponding to respective ACs. For example, consider a case where there is one STA that holds data of AC_VI, and there are six STAs that hold data of AC_BE. In this case, in the group N=0, the AP 100 can allocate an RU having a tone size of 106 to the STA that holds data of AC_VI, and allocate RUs having a tone size of 52 to two STAs out of the STAs that hold data of AC_BE. The AP 100 then allocates RUs having a tone size of 52 to four STAs out of the STAs that hold data of AC_BE in the group N=1. According to these processes, it is possible to secure the frequency use efficiency to be sufficiently high as a whole while preferentially providing a transmission opportunity to STAs that hold data having a high-priority AC.

In addition, if there is any RU that has not been allocated, the AP 100 may increase the tone size of an RU that is allocated to an STA having a large amount of data. For example, in the above-described example, the tone size of the RU that is allocated to the STA 104 that holds data of AC_BE is 52, but, if the queue size is large, the tone size may be increased to 106.

By combining these, in the above-described example, a configuration is possible in which, in the group N=2, RUs having a tone size of 52 are allocated to the STAs 104 and 105, and RUs having a tone size of 26 are allocated to STAs 106 to 110. Accordingly, in order to allocate, in the same group, RUs to the STAs 104 to 109 that hold data of AC_BE, the tone size of the RU is set to 26. Also, in this case, there are nine RUs, and thus, as a result of allocating RUs to six STAs, namely the STAs 104 to 109, three RUs remain. Therefore, one out of the remaining RUs is allocated to the STA 110 that holds data of AC_BK. Two RUs still remain, and thus, for example, RUs having a tone size changed from 26 to 52 are allocated to the STAs 104 and 105 that have large data amounts. Accordingly, it is possible to improve the frequency use efficiency of the entire system while preferentially providing a transmission opportunity to STAs having data of a high-priority AC.

Note that the technique for increasing the tone size of an UR to be allocated to an STA having a large data amount can be applied to Processing Example 1 above. Specifically, in Processing Example 1, if a frequency band remains after RUs have been allocated to all of the STAs, RU reallocation may be performed so as to allocate RUs having a large tone size to STAs having a large amount of data to be transmitted. In addition, at this time, RUs may be allocated in two or more transmission opportunities assuming that, regarding STAs having a larger amount of data to be transmitted than other STAs, the data is divided and transmitted. By dividing data in this manner, it is possible to shorten the communication period of each transmission opportunity, and it is also possible to shorten the entire communication period.

Processing Example 3

Figure 14:
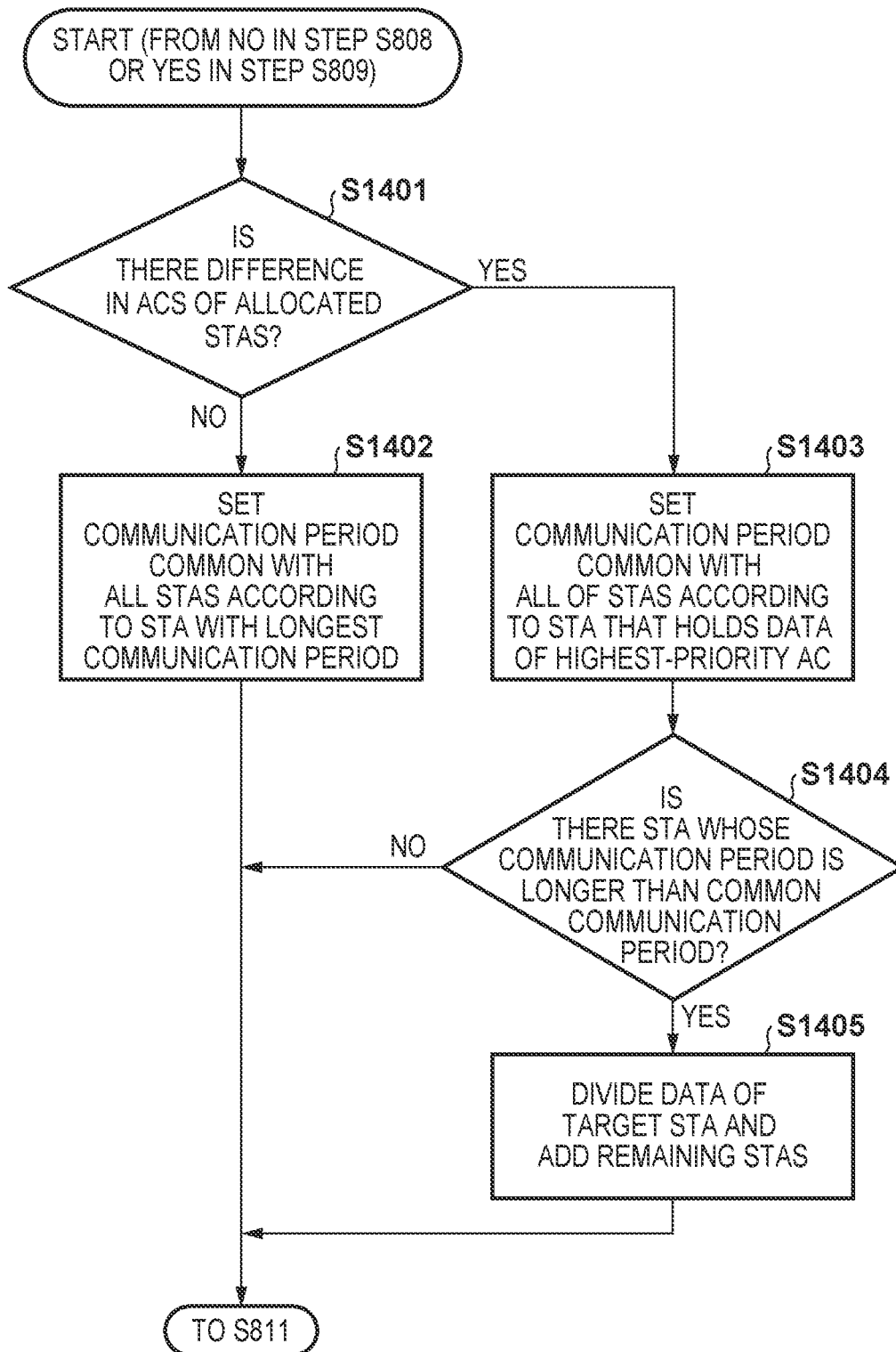
FIG. 14 is a diagram showing a second example a flow of allocation of wireless resources, which is performed by the AP.

In this processing example, if the same group includes a plurality of STAs that hold data of different types of AC, a communication period is determined based on data of a high-priority AC. Accordingly, it is possible to shorten a period until the AP 100 completes processing for receiving high-priority data. In the following example, the AP 100 is notified that the STAs 107 to 109 hold a larger data amount than the STA 101, using a BSR. FIG. 14 shows an example of a flow of processing when the AP 100 executes MU communication in this processing example. If it is determined NO in step S808 in FIG. 8, or it is determined YES in step S809, in other words, after allocation of RUs to STAs ends in the group N, this processing is started.

In this processing, the AP 100 confirms whether or not data held by STAs to which RUs have been allocated is data of the same AC (step S1401). If it is determined that ACs of these pieces of data are all the same (NO in step S1401), similarly to step S810, the AP 100 sets a communication period common with all of the STAs of the group based on an STA whose communication period is longest (step S1402). After that, the AP 100 advances the procedure to step S811 in FIG. 8, and executes RU allocation processing for the next group. On the other hand, if it is determined that the AC of one piece of data in the group is different from the ACs of the other pieces of data (YES in step S1401), the AP 100 sets a communication period with a focus on data of the highest-priority AC. In other words, the AP 100 sets a communication period common with all of the STAs in the group, in accordance with the communication period of the STA that holds data of the highest-priority AC (step S1403). Note that, if there are a plurality of STAs that hold data of the highest-priority AC, a communication period common with all of the STAs of the group can be set in accordance with an STA whose communication period is the longest from among those STAs.

In this processing example, in the group N=0, RUs are allocated to the STAs 101 to 109 through the processing in FIG. 8 until the processing in FIG. 14 is started. In this case, data held by the STA 101 is data of AC_VO, and is different from the ACs of data held by other STAs. Therefore, as a communication period in the group N=0, a common communication period is set in accordance with the communication period of the STA 101 that holds data of the highest-priority AC_VO.

After the communication period is set in step S1403, the AP 100 confirms whether or not there is an STA among the STAs in the group whose scheduled communication period is longer than the common communication period set in step S1403 (step S1404). If it is determined that there is no STA whose communication period is longer than the common communication period (NO in step S1404), the AP 100 advances the procedure to step S811 in FIG. 8, and executes RU allocation processing for the next group. On the other hand, if it is determined that there is an STA whose communication period is longer than the common communication period (YES in step S1404), the AP 100 divides transmission data of the STA, and transmits an portion of the data that exceeds the communication period, for the next and succeeding groups. Therefore, the AP 100 handles this STA as an STA (remaining STA) to which no RU has been allocated (step S1405). The AP 100 then determines that grouping of this STA is not complete (NO in step S805), and allocates this STA to an RU index (step S806). For example, assume that, when an RU having a tone size of 26 is allocated to the STAs 101 to 109, the communication period the STAs 102 to 106 does not exceed the communication period of the STA 101, and the communication period of the STAs 107 to 109 exceeds the communication period of the STA 101. In this case, in the group N=0, RUs having a tone size of 26 are allocated to the STAs 101 to 109, but transmission data of the STAs 107 to 109 is divided, and the STAs 107 to 109 are handled as STAs to which RUs have not been allocated. At this time, transmission data of each of the STAs 107 to 109 is divided such that a communication period in the group N=0 is shorter than or equal to the communication period of the STA 101 that holds data of the highest-priority AC. After that, in the group N=1, RUs having a tone size of 26 are allocated to the STAs 107 to 110. Note that, at this time, if a communication period for transmitting remaining data of the STAs 107 to 109 is shorter than the communication period of the STA 110, data of the STA 110 to be transmitted can be divided. However, in this case, there are RUs that have not been allocated, and thus an RU having a large tone size (for example, a tone size of 52) may be allocated to the STA 110.

This processing example is effective in that a period until reception of high-priority data by the AP 100 is complete is shortened, but is more effective when reallocation processing is performed. If a communication period is set in accordance with data of a low-priority AC, the AP 100 cannot transmit multi BA until the data of a low-priority AC is received. In other words, even if data of a high-priority AC has not been received successfully, the AP 100 needs to wait until data of a low-priority AC is received, so as to be able to transmit multi BA. In contrast, by allocating a communication period based on data of a high-priority AC, the AP 100 can transmit multi BA as soon as reception of data of a high-priority AC fails, and prompt retransmission earlier.

As described above, in this processing example, the AP 100 preferentially allocates an RU to a STA that holds data of a high-priority AC, and sets a communication period so as to be able to transmit multi BA as soon as the data is received. Accordingly, the AP 100 can promptly complete reception of data of a high-priority AC, and can perform retransmission earlier if reception fails.

Note that, in this processing example, a communication period is set in accordance with an STA that holds data of the highest-priority AC in the group, but there is no limitation thereto. In accordance with the circumstances, an AC of data that serves as a reference for setting a communication period may be selected from a predetermined range, for example, a common communication period is set according to the communication period of data of the second-highest priority AC. For example, if an STA that holds data of AC_VO and an STA that holds data of AC_VI belong to the same group, data whose communication period is longer among these pieces of data can be used as a reference for setting a communication period. Specifically, for example, if STAs that have data of C_VO, AC_VI, and AC_BE are assigned to the same group, and the data amount is largest in order of AC_BE, AC_VI, and AC_VO, a common communication period can be determined in accordance of the communication period of the data of AC_VI.

Note that, in the example in FIG. 14, RUs having a tone size of 26 are allocated to the STAs, but, as described above, for example, RUs of different tone sizes may also be allocated to the STAs in accordance with ACs. In this case, communication periods when transmitting data are calculated using tone sizes allocated to the STAs, and, according to the calculation result, a common communication period can be set based on the communication period of data of the highest-priority AC or data of an AC similar to the highest-priority AC. Note that if data is divided according to this, the tone sizes of RUs that are allocated even to the same STA can be different in first data transmission and second data transmission. In other words, regarding each of two groups from which data is transmitted, tone sizes of RUs that are allocated can be independently determined.

In addition, tone sizes may be changed in consideration of MIMO beamforming besides OFDMA. For example, if there are 10 STAs that are spaced substantially equally in the range of four beams in accordance with MIMO (if the number of STAs placed in one beam is four or smaller), communication can be performed only in the group N=0 with a tone size of 52. Note that a communication period at this time may also be based on an STA having data of the highest-priority AC, or data of an AC similar to the highest-priority AC.

In the above processing examples, cases have been described in which the number of ACs of data held by an STA is only one, but an STA may also hold data of a plurality of different ACs. For example, the STA 101 may also hold data of AC_VO and data of AC_BE. In this case, when allocating wireless resources to the STAs, the AP 100 can use a method for allocation with a focus on the STAs and a method for allocation with a focus on the STAs and ACs. For example, in the group N, the AP 100 can allocate, to the STA 101 having the highest-priority data, RUs for all of the pieces of data held by the STA 101. If Processing Example 3 is used at this time, a communication period common with all of the STAs in the group can be set as a communication period sufficient for transmission of the amount of data of AC_VO of the STA 101. Specifically, if a communication period corresponding to the data of AC_BE of the STA 101 is longer than the communication period corresponding to the data of AC_VO, the data of AC_BE of the STA 101 is divided, and can be transmitted also in another group. Note that, using the STA 101 that has data of the highest-priority AC as a reference, a communication period common in the group may be set in accordance with data for which a communication period is longer out of data of AC_VO and data of AC_BE of the STA 101. In addition, in the group N, an RU is allocated to the STA 101 in order to transmit the data of the highest-priority AC_VO. After RUs have been allocated to STAs that have data of AC_VO and data of AC_VI, an RU for transmitting the data of AC_BE can be allocated to the STA 101.

In the above processing examples, RUs are allocated to STAs with a focus only on ACs of data held by the STAs, but RUs may be allocated to the STAs in consideration of queue sizes as well in addition to ACs. For example, consider a case where both ACs of data held by the STAs 104 and 105 are AC_BE. At this time, if the queue size of the STA 104 is twice as large as the queue size of the STA 105, an RU may be allocated preferentially to the STA 104. If Processing Example 3 is applied to this, even if data that is transmitted by the STA 104 is divided, it is possible to suppress, in the next group, the amount of data that is transmitted by the STA 104, and suppress the entire communication period to be short.

Note that, as a condition for defining the group N to which the STAs need to belong, a device class of the STAs may be added. The device class is a class determined based on the accuracy of absolute transmission power of an STA and the accuracy of the RSSI (received signal strength indicator) measurement. STAs are classified into two types, namely a class A and a class B. STAs of the class A have a capability for setting both the accuracy of absolute transmission power and the accuracy of the RSSI measurement to be within ±3 dB. On the other hand, STAs of the class B have capability for setting the sensitivity of the transmission power to ±9 dB, the accuracy of RSSI measurement to ±5 dB, and the accuracy of relative transmission power to ±3 dB. Note that, according to the IEEE802.11ax standard, an STA notifies the AP of its own device class. The AP can then classify the STA according to this notification. Note that this notification is performed using an HE PHY capabilities information element within a management frame such as a probe request or an association request. In an environment in which there are such STAs, as a result of multiplexing, through the OFDMA method, signals of STAs in which the accuracy of transmission power is not good such as STAs of the class B, there can be cases where a large difference in reception power from STAs occurs in the AP. This reception power difference can cause orthogonality of OFDMA to collapse, and intense inter-carrier interference to occur. The influence of such inter-carrier interference is large when a signal is received with low power, and such inter-carrier interference can largely deteriorate the reception performance of the AP in such a case.

Therefore, the AP 100 distinguishes an STA of the class A from an STA of the class B when defining a group for OFDMA multiplex communication. For example, the AP 100 can allocate an STA of the class A and an STA of the class B to different groups. Accordingly, it is possible to prevent a signal transmitted by the STA of the class B from intervening on a signal transmitted by the STA of the class A. In addition, the AP 100 can set a tone size for the STA of the class B to be smaller than a tone size for the STA of the class A. According to this, it is possible to suppress the transmission power of the signal from the STA of the class B, and even if the transmission power deviates to be high due to low accuracy, it is possible to suppress interference power incurred on the signal transmitted by the STA of the class A. In addition, the AP 100 can set a communication period of a group that includes the STA of the class B to be long. Accordingly, if the reception power of the signal transmitted by the STA of the class B is low, probability that the signal will be demodulated successfully is high, and thus it is possible to instruct the STA to lower the transmission power of the signal. Accordingly, it is possible to suppress, to low, the interference power of the signal transmitted by the STA of the class B relative to the signal transmitted by the STA of the class A. In this manner, by performing these processes, it is possible to prevent the signal transmitted by the STA of the class B from intensely intervening on the signal transmitted by the STA of the class A.

For example, in the processing in step S806 in FIG. 8, if there are a plurality of STAs that hold data of a high-priority AC, the AP 100 can preferentially allocate an RU index to the STAs of the class A. In this case, for example, the AP 100 can allocate wireless resources after grouping STAs into a group of STAs of the class A that have data of AC_VI, a group of STAs of the class B that have data of AC_VI, a group of STAs of the class A that have data of AC_BE, etc. In addition, the AP 100 can perform processes in FIGS. 8, 12, 14, etc., separately for the STAs of the class A and the STAs of the class B. Here, for example, one or more groups allocated for STAs of the class A are defined as an N1 group set, and one or more groups allocated for STAs of the class B are defined as an N2 group set. In this case, for example, after communication periods have been allocated to one or more groups belonging to the N1 group set, communication periods are allocated to one or more groups belonging to the N2 group set. Note that communication periods may also be set using another method, in which a communication period of a first group in the N2 group set is set after a communication period of a first group in the N1 group set, and, after that, a communication period of a second group in the N1 group set is set, and the like.

Note that classification into the class A and the class B is exemplary, and, for example, classification may also be performed using another reference, for example, classification of STAs that comply with only one of the accuracy of transmission power and the measurement accuracy of received signal strength. In addition, classification into three or more classes may also be performed. Specifically, for example, processing such as allocation of wireless resources for each class, and reduction of the tone size of an RU that is allocated to an STA of one class to be smaller than the tone size of an RU that is allocated to an STA of another class can be performed in accordance with any classification. In addition, for example, RUs can be preferentially allocated to STAs of a class in a predetermined group from among a plurality of classes. For example, when classification of three stages such as classes 1 to 3 is performed, allocation such as allocation in which RUs are allocated preferentially to STAs of the classes 1 and 2 can be performed. In addition, information regarding classes may be handled preferentially to ACs. Specifically, for example, an RU may be allocated to an STA of the class A described above that holds data of AC_BE, preferentially to an STA of the class B that holds data of AC_VI.

The above embodiment has been described using technical terms of the IEEE802.11ax standard, but these terms are used for promoting understanding of the invention, not for limiting the invention. Accordingly, the above-described technique may be applied for not only the IEEE802.11ax standard but also succeeding standards thereof and other standards of the IEEE802.11 standard series, and can also be applied to a wireless communication standard other than the IEEE802.11 standard series. Accordingly, a communication apparatus that obtains information indicating a priority of data held by each terminal, and allocates wireless resources to the terminal in accordance with the priority as described above can be adopted in any wireless communication system.

Note that wireless resources may be allocated, for example, based on the amount of data to be transmitted in addition to information regarding a priority. Specifically, wireless resources may be allocated preferentially to an STA that holds a large amount of data to be transmitted. Accordingly, for example, an RU may be allocated preferentially even to an STA having data of a low-priority AC if the amount of the data is large (e.g., larger than a predetermined value). The AP 100 can allocate wireless resources to an STA having data size that exceeds a predetermined value, for example, based on information regarding the queue size, without taking ACs into consideration. In addition, in this case, if the data size does not exceed the predetermined value, the AP 100 can allocate wireless resources in accordance with ACs as described above. Also, data that has a low priority AC, and whose amount exceeds the predetermined value can be divided as in Processing Example 3 above, for example, and be transmitted. According to this, if a transmission opportunity is simply given to an STA that has data of a low-priority AC at a later timing, the transmission period of the entire system is extended due to start of transmission of the data being delayed, but this extension of the transmission period can be prevented.

In addition, RUs may also be allocated based on received radio wave strength of a signal from each STA (e.g., BSR). For example, the AP 100 may allocate an RU preferentially to an STA with respect to which the received radio wave strength is larger than or equal to a predetermined value, irrespective of an AC of data held by the STA. Note that, in this case, the AP 100 can allocate wireless resources to an STA with respect to which the received radio wave strength is smaller than the predetermined value, based on an AC as described above. With such a configuration, it is possible to reduce probability that retransmission will occur regarding the STA to which an RU has been preferentially allocated, and suppress the frequency at which processing for reallocating wireless resources is executed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-158572, filed Aug. 27, 2018, which is hereby incorporated by reference herein in its entirety.

What is claimed is:

1. A communication apparatus comprising:
   one or more processors; and
   one or more memories including instructions that, when executed by the one or more processors, cause the communication apparatus to:
   obtain information regarding an access category of transmission data in each of a plurality of other communication apparatuses including a first communication apparatus and a second communication apparatus, wherein a priority of an access category of transmission data in the first communication apparatus is equal to or higher than a priority of an access category of transmission data in the second communication apparatus;
   allocate, based on the obtained information, wireless resources of OFDMA (Orthogonal Frequency Division Multiple Access) such that a first transmission opportunity is given to at least the first communication apparatus by a first trigger frame and that in a case where a maximum number of the wireless resources of OFDMA that can be allocated in one transmission opportunity is exceeded due to allocation of the wireless resources to at least the first communication apparatus, a second transmission opportunity is given to at least the second communication apparatus by a second trigger frame that follows the first trigger frame, and in a case where the maximum number of the wireless resources of OFDMA that can be allocated in one transmission opportunity is not exceeded due to allocation of the wireless resources to at least the first communication apparatus, the first transmission opportunity is given to the second communication apparatus; and
   receive signals that have been respectively transmitted by the first communication apparatus and the second communication apparatus using OFDMA in accordance with the allocation of wireless resources and that conform to an IEEE802.11 series standard.

2. The communication apparatus according to claim 1, wherein the one or more processors execute the instructions to further cause the communication apparatus to:
   obtain information regarding a size of transmission data in each of the plurality of other communication apparatuses,
   specify a communication period until reception is complete under an assumption that the communication apparatus receives the transmission data, from the information regarding the size of the transmission data, and
   set, for each transmission opportunity, a communication period common with one or more other communication apparatuses in accordance with an access category of transmission data in the one or more other communication apparatuses to which wireless resources corresponding to the transmission opportunity are allocated and the specified communication period.

3. The communication apparatus according to claim 1, wherein a frequency band having a fixed width is allocated in order from another communication apparatus that holds transmission data of a high-priority access category.

4. The communication apparatus according to claim 1, wherein a frequency band that has not been allocated by the allocation based on an access category is allocated to another communication apparatus that has a larger amount of transmission data than other communication apparatuses.

5. The communication apparatus according to claim 1, wherein the wireless resources are reallocated based on that transmission data in one of the plurality of other communication apparatuses has been added.

6. The communication apparatus according to claim 1, wherein the one or more processors execute the instructions to further cause the communication apparatus to:
classify the plurality of other communication apparatuses based on accuracy of transmission power and accuracy of measurement of received signal strength.

7. The communication apparatus according to claim 6, wherein wireless resources are allocated so as to give different transmission opportunities to another communication apparatus of a first class and another communication apparatus of a second class.

8. The communication apparatus according to claim 6, wherein wireless resources are allocated to another communication apparatus of a first class so as to allocate a frequency band having a narrower width than another communication apparatus of a second class in which the accuracy of transmission power and the accuracy of measurement of received signal strength is higher than that of the communication apparatus of the first class.

9. The communication apparatus according to claim 6, wherein wireless resources are allocated to another communication apparatus of a first class so as to set a communication period longer than that for another communication apparatus of a second class in which the accuracy of transmission power and the accuracy of measurement of received signal strength is higher than that of the communication apparatus of the first class.

10. The communication apparatus according to claim 6, wherein the classification is performed based on a value of an HE PHY capabilities information element of a management frame transmitted from each of the plurality of other communication apparatuses.

11. The communication apparatus according to claim 1, wherein information regarding transmission data in another communication apparatus is obtained using a buffer status report (BSR) transmitted from the another communication apparatus.

12. The communication apparatus according to claim 1, wherein information regarding transmission data in another communication apparatus is obtained using a QoS Control field or an HT Control field in a data frame transmitted from the another communication apparatus.

13. The communication apparatus according to claim 1, wherein the communication apparatus is an access point conforming to an IEEE802.11ax standard.

14. A method for controlling a communication apparatus, comprising:
obtaining information regarding an access category of transmission data in each of a plurality of other communication apparatuses including a first communication apparatus and a second communication apparatus, wherein a priority of an access category of transmission data in the first communication apparatus is equal to or higher than a priority of an access category of transmission data in the second communication apparatus;
allocating, based on the obtained information, wireless resources of OFDMA (Orthogonal Frequency Division Multiple Access) such that a transmission opportunity is given to at least the first communication apparatus by a first trigger frame and that in a case where a maximum number of the wireless resources of OFDMA that can be allocated in one transmission opportunity is exceeded due to allocation of the wireless resources to at least the first communication apparatus, a second transmission opportunity is given to at least the second communication apparatus by a second trigger frame that follows the first trigger frame, and in a case where the maximum number of the wireless resources of OFDMA that can be allocated in one transmission opportunity is not exceeded due to allocation of the wireless resources to at least the first communication apparatus, the first transmission opportunity is given to the second communication apparatus; and
receiving signals that have been respectively transmitted by the first communication apparatus and the second communication apparatus using OFDMA in accordance with the allocation of wireless resources and that conform to an IEEE802.11 series standard.

15. A non-transitory computer-readable storage medium that stores a program for causing, when executed by a computer included in a communication apparatus, the communication apparatus to:
obtain information regarding an access category of transmission data in each of a plurality of other communication apparatuses including a first communication apparatus and a second communication apparatus, wherein a priority of an access category of transmission data in the first communication apparatus is equal to or higher than a priority of an access category of transmission data in the second communication apparatus;
allocate, based on the obtained information, wireless resources of OFDMA (Orthogonal Frequency Division Multiple Access) such that a first transmission opportunity is given to at least the first communication apparatus by a first trigger frame and that in a case where a maximum number of the wireless resources of OFDMA that can be allocated in one transmission opportunity is exceeded due to allocation of the wireless resources to at least the first communication apparatus, a second transmission opportunity is given to at least the second communication apparatus by a second trigger frame that follows the first trigger frame, and in a case where the maximum number of the wireless resources of OFDMA that can be allocated in one transmission opportunity is not exceeded due to allocation of the wireless resources to at least the first communication apparatus, the first transmission opportunity is given to the second communication apparatus; and
receive signals that have been respectively transmitted by the first communication apparatus and the second communication apparatus using OFDMA in accordance with the allocation of wireless resources and that conform to an IEEE802.11 series standard.

* * * * *